Oct. 21, 1924.  1,512,513

J. WARD

ANIMAL TRAP

Filed March 13, 1924   2 Sheets-Sheet 1

INVENTOR.
Jay Ward
BY
Robb Robb Hill
ATTORNEYS

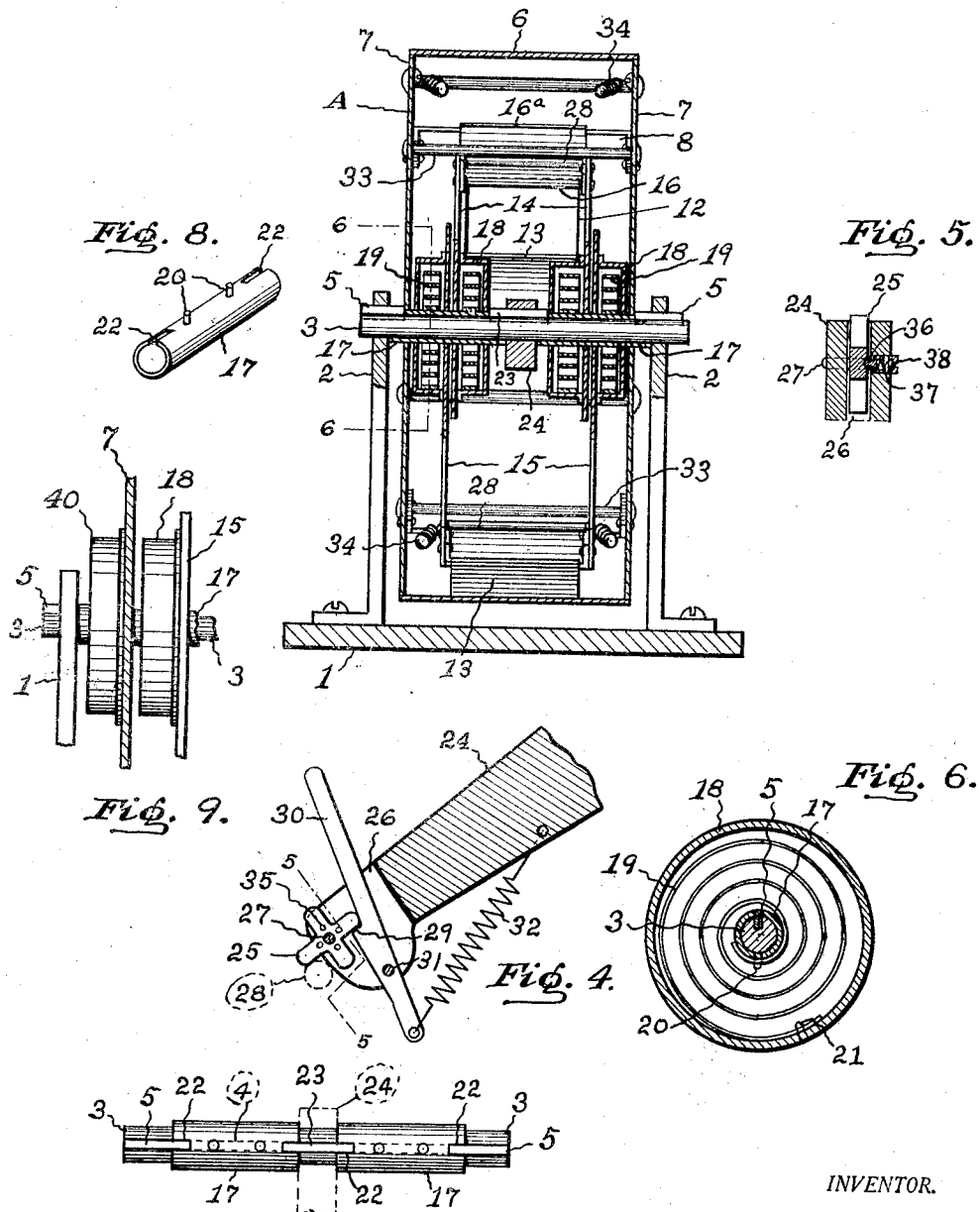

Patented Oct. 21, 1924.

1,512,513

UNITED STATES PATENT OFFICE.

JAY WARD, OF HURON, OHIO.

ANIMAL TRAP.

Application filed March 13, 1924. Serial No. 698,853.

*To all whom it may concern:*

Be it known that I, JAY WARD, a citizen of the United States, residing at Huron, in the county of Erie and State of Ohio, have invented certain new and useful Improvements in Animal Traps, of which the following is a specification.

The present invention relates to an animal trap and has for its object to provide a device of this character which embodies novel features of construction, whereby the animals may be caught in succession one after the other and which may be used to advantage for the killing of large quantities of small animals such as rats.

Further objects of the invention are to provide a trap of this character which is comparatively simple and inexpensive in its construction, which is not liable to break or get out of repair, which is certain in its action, which can be easily set, and which will catch and kill a large number of the animals in succession.

With the foregoing and other objects in view the invention consists in certain combinations and arrangements of the parts as will more fully appear as the description proceeds, the novel features thereof being pointed out in the appended claims.

For a full understanding of the invention reference is to be had to the following description and accompanying drawings, in which, Figure 1 is a top plan view of an animal trap which is constructed in accordance with the invention.

Figure 3 is a transverse sectional view on the line 3—3 of Figure 2.

Figure 4 is an enlarged sectional view through the free end of the trip carrying arm, showing the trip mechanism in detail.

Figure 5 is a sectional view on the line 5—5 of Figure 4, looking in the direction of the arrows.

Figure 6 is an enlarged sectional view on the line 6—6 of Figure 3.

Figure 7 is a plan view of the main shaft with the spring carrying sleeves showing the manner of keying the sleeves and trip carrying arm on the shaft.

Figure 8 is a detail perspective view of one of the spring carrying sleeves.

Figure 9 is a detail view showing a slight modification in which a spring is applied to the drum for positively rotating the same when such is desired.

Corresponding and like parts are referred to in the following description and indicated on all of the views of the drawings by like reference characters.

Figure 1:
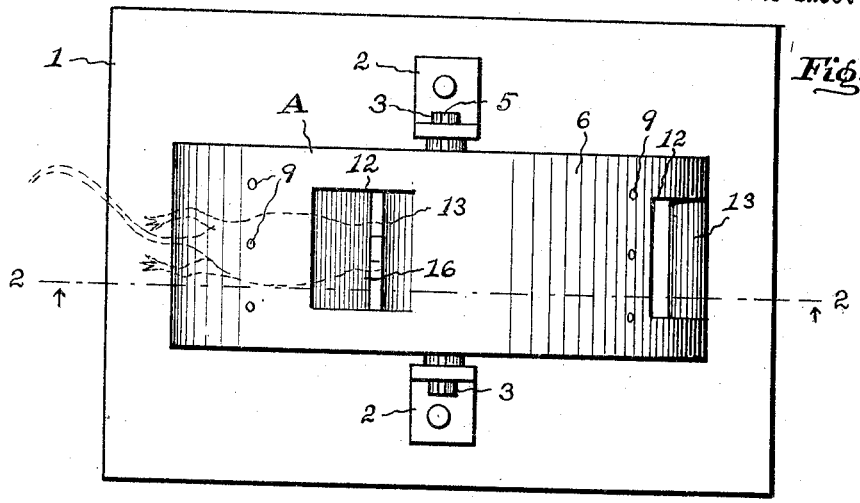

Referring to the drawings, which illustrate one of many possible embodiments of the invention, the reference numeral 1 designates a base and the numerals 2 a pair of standards which project upwardly from the base. A main shaft 3 connects the standards 2, said shaft being formed with a spline 4 which extends the full length thereof and the shaft being held against rotation in the brackets by means of the end keys 5 which are fitted in the spline of the shaft.

A rotatable drum A is supported on the shaft, said drum being hollow and comprising the peripheral wall 6 and the end walls 7. The marginal portions of the end walls 7 are shown as connected at suitable intervals by cross bars 8 to which the peripheral wall 6 is connected by suitable fastening members, such as the bolts 9. The end walls 7 are preferably provided with openings 10 so that an abundance of light and air is admitted to the interior of the drum. The openings 10 are shown as provided with the wire meshing 11 to prevent any animals from entering the drum through the openings, and the provision of these openings admits light and air to the interior of the drum so that an animal will not have the feeling that it is entering a closed chamber when it thrusts its head through one of the trap openings. The peripheral wall 6 of the drum is formed with a series of trap openings 12. In the specific construction shown on the drawings there are four of these trap openings which are arranged in pairs, the openings of each pair being diametrically opposite to each other. A jaw member 13 extends inwardly from an edge of each of the trap openings, having an inclined relation to the peripheral wall and terminating in a sharp edge portion which extends transversely across the trap opening and is adapted to cooperate with a relatively movable jaw member to catch an animal when the trap is sprung.

Arranged within the drum are the cross arms 14, 14 and the cross arms 15, 15. One pair of cross arms is provided for each pair of the trap openings 12, and the opposite ends of both pairs of cross arms carry the jaw members 16. As compared to an ordinary trap the jaw members 16 are the movable jaws of the trap, while the jaw members 13 are the fixed jaws of the trap, although this terminology does not accurately apply to the present trap for the reason that both sets of jaw members revolve with the drum when the drum rotates to bring a different set of jaw members into operative position. The middle portions of the cross arms 14 and 15 are journaled upon sleeves 17 which are fitted upon the shaft 3, and spring housings 18 are rigidly applied to the cross arms. Spiral springs 19 are arranged within the housings 18, said springs having the inner ends thereof connected to pins 20 on the sleeves 17, while the outer ends of the springs are connected to the spring housings, as indicated at 21 on Figure 6. When the springs have been wound up and are under tension they tend to revolve the cross arms in a clock-wise direction, when viewing the trap in the manner shown by Figure 2.

The sleeves 17 are adapted to slip loosely over the shaft and are provided at opposite ends thereof with the key receiving notches 22. The notches 22 at the outer ends of the sleeves engage the end keys 5 which also serve to key the main shaft 3 to the standards 2, while the notches 22 at the inner ends of the sleeves engage a key member 23 which is arranged at the middle portion of the shaft and serves also to lock the trip supporting arm 24 to the shaft. This arm 24 inclines downwardly and forwardly toward the entrance of the trap and remains in a fixed position during the operation of the trap. The end of the arm 24 is provided with a star wheel 25 which is so arranged that as the wheel rotates the arms thereof are caused to project successively from the end of the arm. The star wheel is arranged within a bifurcation 26 at the end of the trip supporting arm, being journaled on a shaft 27. The cross arms 14 and 15 are connected at their end portions by transverse rods 28, which are spaced from the axis of the drum so that they will just clear the end of the arm 24 as the cross arms rotate upon the sleeves and shaft. These transverse rods 28 are adapted to successively engage the projecting arms of the star wheel 25. The star wheel is then held against rotation by the engagement of an inwardly projecting arm thereof with a shoulder 29 on a trip lever 30. The trip lever is arranged within the bifurcation 26, being pivoted within the lower portion of the bifurcation on the pin 31. The upper end of the trip lever 30 extends upwardly from the trip supporting arm 24 and may have any suitable bait B applied thereto, while the lower end of the trip lever extends downwardly below the pivot pin 31 and has a spring 32 connected thereto, said spring normally tending to swing the trip lever into operative position.

The end walls of the drum A are connected at intervals by cross bars 33, one of the cross bars being provided between each of the end portions of the cross arms 14 and 15 and the cross bars being arranged toward the outer periphery of the drum so that they will clear the trip supporting arm 24 during the rotation of the drum. One set of the cross bars 33 is adapted to bear against the cross arms which are held against rotation by the trip mechanism, thereby providing for a step by step rotation of the drum under the power of the cross arms as the animals are successively caught in the trap. The ends of the cross arms 14 and 15 are engaged by tension springs 34 which are placed under tension when the respective jaws are set, said springs tending to impart a quick action to the trap mechanism when it is sprung and also serving as a cushioning means to eliminate sudden jar at the end of each increment of rotation given to the drum during the operation thereof.

Figure 2:
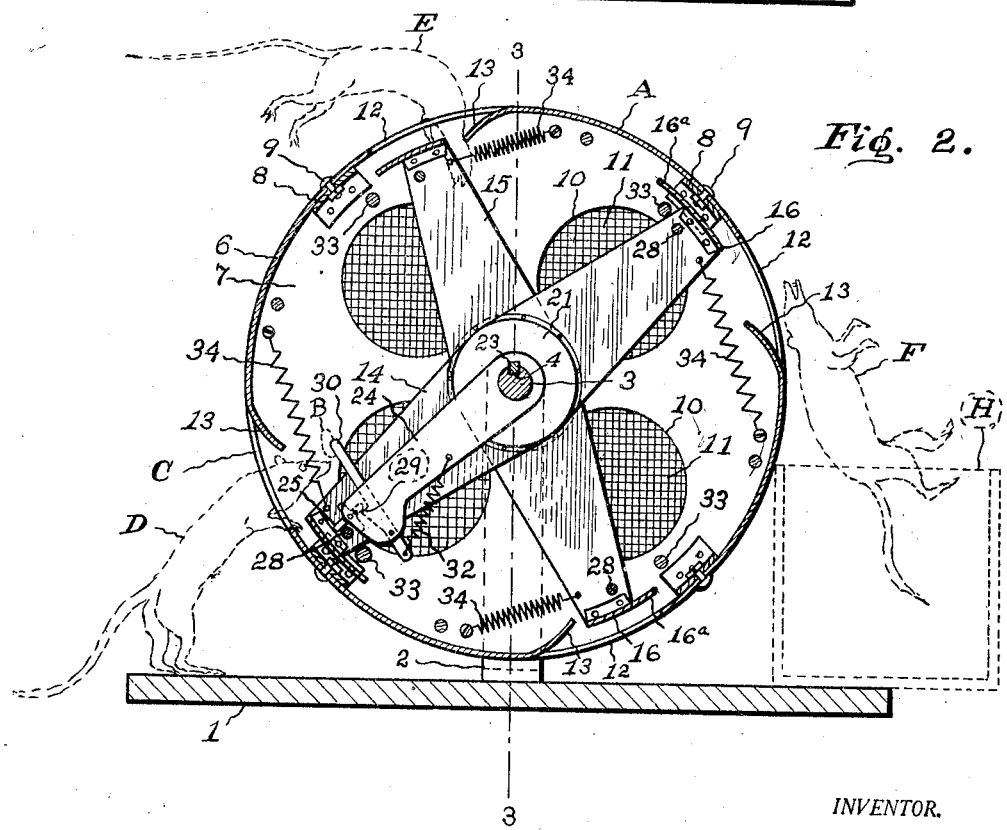
Figure 2 is a vertical sectional view on the line 2—2 of Figure 1, looking in the direction of the arrows.

In order to wind up the springs 19 and initially set the trap, the drum A is manually rotated in a counter clock-wise direction, viewing the same from the direction of Figure 2. The jaw members 13 of the drum are then brought into engagement with the corresponding jaw members 16 of the cross arms, so that the cross arms 14 and 15 are rotated with the drum. The transverse rods 28 of the cross arms rotate the star wheel 25 as they pass the same, although this backward rotation of the star wheel is not prevented by the trip lever 30, the latter swinging inwardly to enable the arms of the star wheel to clear the shoulder of the trip lever. After the springs 19 have been wound up in this manner the drum is released, whereupon the tension of the springs will rotate the cross arms in clock-wise directions until one of the transverse rods 28 engages the star wheel 25. The particular pair of cross arms carrying the said transverse rod 28 will then be held against further movement by the trip mechanism, although the other pair of cross arms will continue to rotate and will rotate the drum with them until one set of the cross bars 33 engages the first mentioned set of cross arms. Further rotation of the drum is then prevented, and the trap is in a set position with the springs 34 of the first mentioned cross arms under tension.

Referring to Figure 2 of the drawings, the trap opening 12 which is in position to form the entrance to the trap is designated by the reference character C. This opening is at the front of the trap and toward the bottom thereof, so that it can be reached without difficulty by one of the animals for which the trap has been set. This opening C is opposite the trip mechanism and the bait B which is applied to the upper end of the trip lever 30 is arranged within the drum just back of the entrance opening. The trap is intended to be set in a location which is infested with the animals to be caught, and when one of the animals is attracted by the bait it will find it necessary to thrust its head through the opening C in order to reach the bait. The efforts of the animal to get the bait will cause it to swing the upper end of the trip lever 30 rearwardly and disengage the shoulder 29 of the trip lever from the star wheel. The cross arms carrying the movable jaw member 16 at the entrance of the trap are thus suddenly released and the combined action of the main spiral springs 19 and the particular springs 34 which were connected to the cross arms of the jaw member, now produce a quick swing of the cross arms with the result that the animal is caught by the neck between the jaw members 13 and 16. The drum is rotated a quarter rotation and the transverse rod 28 of the successive jaw members 16 is then engaged by the star wheel 25 of the trip mechanism. The main springs 19 of the cross arms which have just been released, however, cause the jaw members 16 thereof to act upon the corresponding jaw members 13 to retain their grip upon the animal which has just been caught and continue the rotation of the drum until a set of cross bars 33 are brought into engagement with the cross arms which have been arrested in their movement by the trip mechanism. This rotation of the drum after one set of the cross arms has been engaged by the trip mechanism serves to open the jaws of the trap at the trap opening which is opposite the bait and also at the diametrically opposite trap opening at the back of the drum. A dead animal which might have been held by the latter mentioned set of jaws will thus be released and permitted to drop upon the ground or into a suitable receptacle which may be provided to receive the same.

It will thus be obvious that the drum is rotated forward one step each time an animal is caught. The animal which has just been caught is still gripped between the trap jaws and held at the top of the trap until another animal enters the trap and springs the same. When this next animal is caught the first animal will be swung around to the back of the trap and released. Referring to Figure 2 of the drawings, an animal about to enter the trap is indicated by dotted lines at D, while an animal which was previously caught and is still gripped between the trap jaws at the top of the trap is indicated by dotted lines at E. An animal which was caught before the animal E and which has just been released by the opening of the corresponding trap jaws on the second successive actuation of the trap following its capture, is indicated by dotted lines at F. A suitable receptacle H may be provided for receiving the dead animals if desired, and it is obvious that the trap will continue to set itself automatically and catch the animals in succession until the main springs 19 have run down. It will then be necessary to wind up the trap again and this can be done, as previously described, by grasping the drum A with the hands and forcibly rotating it in a backward direction.

In order to insure proper action of the star wheel 25 and prevent possible over-running thereof, one side of the star wheel may be provided with a series of depressions 35 (see Figs. 4 and 5). One of the depressions is provided for each of the arms of the star wheel and these depressions are successively engaged by a spring plunger 36 which is mounted in one side of the trip supporting arm 24. A spring 37 is interposed between the rear end of this plunger and a screw 38 and normally holds the plunger yieldingly in operative position. The plunger snaps into the successive depressions 35 as the star wheel is rotated and operates in the well known manner to prevent over-running of the star wheel, such as might result in rendering the trip mechanism inoperative and enabling the drum to revolve until the springs ran down. The movable jaw members 16 are provided at the rear edges thereof with extensions 16$^a$ so that when the jaw 16 closes against the jaw member 13 the corresponding trap opening 12 is closed by the jaw 16 and its extension 16$^a$, thereby preventing an animal from entering the trap through any of the trap openings which are at the lower part of the drum, with the exception of the particular trap opening which is opposite the bait B and trip mechanism.

A slight modification is illustrated by Figure 9, in which a spring housing 40 is applied to the drum A on the outside thereof, thereby providing a positive spring drive for the drum, so that both the drum and the jaw carrying cross arms are provided with spring motor devices. The usual spring will be housed within the housing 40, and this construction may be employed if it is found desirable to provide the drum with a spring motor as well as jaw carrying cross arms.

While one particular embodiment of the invention has been shown and described in detail for illustrative purposes, it will be understood that many modifications and changes can be made in the details of construction without departing from the spirit of the invention and all within the scope of the appended claims.

Having thus described my invention what I claim as new and desire to secure by Letters Patent is,

1. An animal trap including a carrier, a series of sets of jaws thereon, means for moving the carrier to bring the sets of jaws successively into operative position, and means for setting the jaws as they are brought into operative position.

2. An animal trap including a carrier, a series of sets of jaws mounted thereon, trip controlled means for permitting a step by step movement of the carrier to bring the different sets of jaws successively into operative position, and means for setting the jaws as they are brought into operative position.

3. An animal trap including a carrier, a series of sets of jaws thereon, means for moving the carrier to bring the different sets of jaws successively into operative position, means for opening the jaws of each set as they are brought into operative position and a single trip means controlling the jaws that are in operative position and also controlling the movements of the carrier.

4. An animal trap including a carrier, a series of sets of jaws thereon, motor means performing the double function of actuating the jaws and moving the carrier, and trip means controlling the movements of the carrier whereby the different sets of jaws are brought successively into operative position.

5. An animal trap including a carrier, a plurality of sets of jaws thereon, springs performing the double function of actuating the jaws and moving the carrier to bring the sets of jaws successively into operative position, and a single trip means controlling the jaws that are in operative position and also controlling the movements of the carrier.

6. An animal trap including a rotatable carrier, a series of sets of cooperating jaws thereon, means for rotating the carrier to bring the sets of jaws successively into operative position, means for setting the jaws as they are brought into operative position and trip means controlling the trap jaws and the rotation of the carrier.

7. An animal trap including a rotatable carrier, jaw members thereon, swinging arms, jaws carried by the swinging arms and complemental to the first mentioned jaws, motor means for actuating the arms, trip means for successively engaging the arms to control the movements thereof, the disengaged arms operating to rotate the carrier to open the trap jaws corresponding to the arm which is engaged by the trip mechanism.

8. An animal trap including a rotatable carrier, jaws thereon, swinging arms provided with jaws which are complemental to the first mentioned jaws, motor means for swinging the arms to actuate the jaws and rotate the carrier, trip means successively engaging the arms to stop the same, the disengaged arms then rotating the carrier to open the jaws corresponding to the arm which has been engaged by the trip mechanism, and stop means preventing further movement of the carrier when the carrier has been rotated a sufficient amount to open the said jaws.

9. An animal trap including a rotatable carrier, jaws thereon, swinging arms mounted concentric with the carrier and provided with jaws which are complemental to the first mentioned jaws, motor means for swinging the arms to actuate the trap jaws and rotate the carrier, trip means for successively engaging the arms, tension springs connecting the arms to the carrier, the disengaged arms serving to rotate the carrier after engagement of one of the arms with the trip mechanism to place the springs for the said arm under tension and open the trap jaws corresponding to the arm, and stop means for preventing further rotation of the carrier.

10. An animal trap including a rotatable carrier, jaws thereon, swinging arms mounted concentric with the carrier and provided with jaws which are complemental to the first mentioned jaws, motor means for swinging the arms to actuate the jaws and rotate the carrier, trip means for successively engaging the arms, the disengaged arms then rotating the carrier until the jaws of the engaged arm have been opened, stop means preventing further movement of the carrier after the said jaws have been opened, and a bait carrying release member controlling the trip mechanism and arranged in cooperative relation to the open jaws of the arm in engagement with the trip mechanism.

11. An animal trap including a rotatable carrier, jaws thereon, swinging arms mounted concentric with the carrier and provided with jaws complemental to the first mentioned jaws, motor means for swinging the arms to actuate the jaws, the opposed relation of the jaws enabling the carrier to be rotated by the motor means of the arms, trip means for successively engaging the arms, the disengaged arms then rotating the carrier until the jaws of the engaged arm have been opened, stop means on the drum engaging the arm in engagement with the trip mechanism to prevent further movement of the drum after the jaws of the said arm have been opened, and animal actuated means arranged in cooperative relation to the open trap jaws and controlling the trip mechanism.

12. An animal trap including a rotatable carrier, jaws thereon, swinging arms mounted concentric with the carrier and provided with jaws complemental to the first mentioned jaws, motor means for swinging the arms to actuate the trap jaws, the opposed relation of the jaws to each other enabling the carrier to be rotated by the motor means of the arms, a star wheel, means carried by the arms for seccessively engaging the star wheel whereby the arms are successively arrested in their movements, a trip lever controlling the movements of the star wheel, the disengaged arms serving to rotate the carrier until the jaws of the arm which was arrested by the star wheel have been opened, and stop means preventing further movement of the carrier.

13. An animal trap including a rotatable carrier, jaws thereon, swinging arms mounted concentric with the carrier and provided with jaws complemental to the first mentioned jaws, motor means for moving the swinging arms to actuate the trap jaws and operate through the trap jaws to rotate the carrier, a trip support, a star wheel thereon, rods carried by the arms and adapted to successively engage the star wheel whereby the arms are successively arrested in their movements, the disengaged arms then rotating the carrier until the jaws of the arrested arm have been opened, stop means preventing further rotation of the carrier after the said jaws have been opened, and a bait carrying trip lever controlling the star wheel and arranged in cooperative relation to the open jaws of the arrested arm.

14. An animal trap including a rotatable carrier, jaws thereon, swinging arms mounted concentric with the carrier and provided with jaws complemental to the first mentioned jaws, motor means for swinging the arms to actuate the trap jaws and operate through the jaws to rotate the carrier, a fixed trip support, a star wheel thereon, means carried by the arms for engaging the star wheel whereby the arms are successively arrested in their movements, tension springs connecting the arms to the carrier, the disengaged arms operating to rotate the carrier after one of the arms has been engaged by the star wheel until the jaws of the said engaged arm have been opened and the tension springs thereof placed under tension, and a bait carrying trip lever controlling the star wheel and arranged in cooperative relation to the open jaws of the arrested arm.

15. An animal trap including a fixed shaft, a rotatable carrier mounted thereon and provided with jaws, swinging arms mounted on the shaft and provided with jaws complemental to the first mentioned jaws, motor means for swinging the arms to actuate the trap jaws and operate through the same to rotate the carrier, a fixed trip supporting arm mounted on the shaft, a trip element thereon for successively arresting the movements of the arms, the other arms then rotating the carrier until the jaws of the arrested arm have been opened, stop means preventing further rotation of the carrier, and an animal actuated control element for the trip means arranged in cooperative relation to the open jaws of the arrested arm.

16. An animal trap including a rotatable carrier provided with a plurality of jaws arranged in oppositely disposed pairs, a plurality of swinging arms pivoted at intermediate points and provided at their opposite ends with jaws which are complemental to the first mentioned jaws, motor means for swinging the arms to actuate the jaws and rotate the carrier, trip means for successively engaging the arms to arrest the same in their movements, the disengaged arms serving to rotate the carrier until the pairs of jaws at the opposite ends of the arrested arms have been opened, whereby one of the pairs of jaws is set and an animal which was previously caught in the other pair of jaws released.

17. An animal trap including a rotatable carrier provided with a plurality of pairs of jaws arranged upon the carrier in substantially diametrically opposite positions, a plurality of swinging arms pivoted at intermediate points and provided at their opposite ends with jaws which are complemental to the first mentioned jaws, motor means for swinging the arms to actuate the trap jaws and rotate the carrier, a trip element, means upon the ends of the arms for engaging the trip element whereby the arms are successively arrested in their movements, the disengaged arms then serving to rotate the carrier until the jaws at opposite ends of the arrested arm have been opened, whereby one pair of the jaws is set and an animal previously caught in the other pair of jaws released, and an animal actuated element controlling the trip member and arranged in cooperative relation to the jaws which are set.

18. An animal trap including a fixed shaft provided with a spline, a trip carrying arm fitted upon the shaft, a sleeve fitted upon the shaft, a key fitted in the spline of the shaft and engaging both the trip carrying arm and the sleeve to hold the said members against rotation, a rotatable carrier mounted on the sleeve and provided with a series of jaws, swinging arms mounted on the sleeve and provided with jaws which are complemental to the first mentioned jaws, springs connecting the arms and the sleeves and acting upon the arms to swing the same, said arms serving to actuate the trap jaws and also operating through the trap jaws to rotate the carrier, a trip member on the trip supporting arm, means on the swinging arms for engaging the trip member whereby the swinging arms are successively arrested in their movements, the swinging arms which are not engaged by the trip member then rotating the carrier to open the jaws corresponding to the arrested arm, stop means for preventing further rotation of the carrier at this point, and an animal actuated element controlling the trip member and arranged in cooperative relation to the open jaws of the swinging arm which is in engagement with the trip member.

19. An animal trap including a rotatable carrier, a series of sets of cooperating jaws mounted thereon, means for rotating the carrier to bring the sets of jaws successively into operative position, means for simultaneously setting the jaws as they are brought into operative position, and opening another pair of jaws to release a previously caught animal.

20. An animal trap including a rotatable carrier provided with a series of sets of jaws which are arranged in opposed pairs, operative connections between the opposed pairs of jaws whereby they are simultaneously opened and closed, means for rotating the carrier to bring the sets of jaws successively into operative position, and means for setting the jaws as they are brought into operative position, the other jaws of the pair being simultaneously opened to release a previously caught animal.

21. An animal trap including a rotatable carrier, a series of sets of cooperating jaws carried thereby and arranged in opposed pairs, an operative connection between the opposed pairs of jaws whereby they are simultaneously opened and closed, means for rotating the carrier to bring the sets of jaws successively into operative position, means for setting the jaws as they are brought into operative position, the other jaws of the pair being simultaneously opened to release a previously caught animal, and trip means controlling the jaws which have been set and the rotation of the carrier.

In testimony whereof I affix my signature.

JAY WARD.